United States Patent
Gonzalez Escudero

(10) Patent No.: US 11,166,256 B2
(45) Date of Patent: Nov. 2, 2021

(54) METHOD AND RADIO ACCESS NETWORK NODE FOR HANDLING A WIRELESS DEVICE CAPABLE OF ALTERNATING BETWEEN IDLE AND ACTIVE STATE

(71) Applicant: Telefonaktiebolaget LM Ericsson (publ), Stockholm (SE)

(72) Inventor: Alberto Gonzalez Escudero, Linköping (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/967,419

(22) PCT Filed: Feb. 5, 2018

(86) PCT No.: PCT/SE2018/050097
§ 371 (c)(1),
(2) Date: Aug. 5, 2020

(87) PCT Pub. No.: WO2019/151916
PCT Pub. Date: Aug. 8, 2019

(65) Prior Publication Data
US 2021/0092705 A1 Mar. 25, 2021

(51) Int. Cl.
*H04W 68/00* (2009.01)
*H04W 76/28* (2018.01)
(Continued)

(52) U.S. Cl.
CPC .......... *H04W 68/005* (2013.01); *H04L 47/30* (2013.01); *H04L 47/32* (2013.01); *H04W 76/28* (2018.02)

(58) Field of Classification Search
CPC .... H04W 68/005; H04W 76/28; H04L 47/30; H04L 47/32
See application file for complete search history.

(56) References Cited

U.S. PATENT DOCUMENTS

2010/0037311 A1    2/2010  He et al.

FOREIGN PATENT DOCUMENTS

| EP | 1708538 A1 * | 10/2006 | .......... H04W 12/125 |
| EP | 1708538 A1 | 10/2006 | |
| WO | 2007019583 A2 | 2/2007 | |

OTHER PUBLICATIONS

International Search Report and Written Opinion for International Application No. PCT/SE2018/050097, dated Sep. 27, 2018, 11 pages.

(Continued)

*Primary Examiner* — Siming Liu
(74) *Attorney, Agent, or Firm* — Nicholson De Vos Webster & Elliott LLP

(57) ABSTRACT

A method performed by a radio access network node of a wireless communication network, for handling a wireless communication device capable of alternating between an idle state and an active state. The method comprises receiving packets related to a communication between the wireless communication device and an external node, and determining whether the packets are directed only from the external node towards the wireless communication device. If so, the node refrains from sending a paging notification to the device for a first time period including a first in time occurring active state of the device after the determination, but if not, the node sends the paging notification to the device at the first in time occurring active state.

21 Claims, 11 Drawing Sheets

(51) Int. Cl.
*H04L 12/835* (2013.01)
*H04L 12/823* (2013.01)

(56) References Cited

OTHER PUBLICATIONS

3GPP TS 36.321 V14.3.0, "3rd Generation Partnership Project; Technical Specification Group Radio Access Network; Evolved Universal Terrestrial Radio Access (E-UTRA); Medium Access Control (MAC) protocol specification (Release 14)," Jun. 2017, 107 pages, 3GPP Organizational Partners.

* cited by examiner

ମETHOD AND RADIO ACCESS NETWORK NODE FOR HANDLING A WIRELESS DEVICE CAPABLE OF ALTERNATING BETWEEN IDLE AND ACTIVE STATE

CROSS-REFERENCE TO RELATED APPLICATIONS

This application is a National stage of International Application No. PCT/SE2018/050097, filed Feb. 5, 2018, which is hereby incorporated by reference.

TECHNICAL FIELD

The present disclosure relates generally to a method and a radio access network node of a wireless communication network, for handling a wireless communication device capable of alternating between an idle state, in which the wireless communication device does not listen to wireless signals from the wireless communication network, and an active state, in which the wireless communication device listens to wireless signals from the wireless communication network.

BACKGROUND

In wireless communication networks of today, there is a risk of attacks from outside the network, attacks that in different ways try to prevent or slow down communication over the network. For preventing such attacks, wireless communication networks have firewalls installed that can detect and stop different types of attacks.

Further, for wireless communication devices used for communication in wireless communication networks there is an interest to save battery power. For saving battery power, there are solutions in which a wireless communication device is capable of alternating between an idle state, in which the wireless communication device does not listen to wireless signals from the wireless communication network, and an active state, in which the wireless communication device listens to wireless signals from the wireless communication network. In the idle state, the wireless communication device turns off parts of its power consuming equipment, such as the receiver, and thereby saves battery power. The wireless communication network and the wireless communication device together negotiate time cycles, including time periods for when the device is to be in the active state and time periods when the device is to be in the idle state, so that both the network and the device knows when the device can send data to the network and receive data from the network. When the network likes to send data to the device, the network sends a paging notification to the device informing the device that it would like to send data. The paging notification is sent in an active state time period. When receiving the paging notification, the device connects to the network and receives the data. When data has been received, the device enters the idle state again until the next time the device enters the active state to check whether there is data to receive or whether the device needs to send data itself. Such solutions, and similar solutions, may be called discontinuous communication methods.

However, for wireless communication devices using such discontinuous communication methods there is a risk of low-bandwidth attacks. A third party having knowledge of an address with which a wireless communication device using a discontinuous communication method can be contacted, may send a more or less constant flow of packets to the wireless communication device. When a radio access network node serving the wireless communication device receives such a flow of packets, it will send paging notifications to the wireless communication device when the device is in the active state. Hereby, the wireless communication device can be kept in the active state more or less constantly. This will drain the battery of the wireless communication device much faster than expected. In case of devices with extended active state—idle state time cycles, like for example Internet of Things (IoT) devices and Machine to machine (M2M) devices, an expected battery life time of months can hereby be shortened to days or even hours.

Such a third party attack can be considered a sophisticated low-bandwidth Denial of Service attack, as any type of communication at low packet rate can trigger such an attack. Traditional firewalls will have severe issues detecting such an attack as they do not have knowledge of the state in which the wireless communication device is, and thereby the traffic mix can be disguised as legitimate.

Further, by sending such a flow of packets to the wireless communication device, wireless communication resources are used that could have been used for other communication. Also, resources in the radio access network node are consumed.

Consequently, there is a need of a solution for preventing such attacks.

SUMMARY

It is an object of the invention to address at least some of the problems and issues outlined above. It is an object of embodiments of the invention to prevent low-bandwidth attacks on wireless communication devices using discontinuous communication methods. Further, it is another object of embodiments to prevent drainage of battery power of wireless communication devices using discontinuous communication methods. It is possible to achieve at least some of these objects and possibly others by using a method, a radio access network node and a computer program as defined in the attached independent claims.

According to one aspect, a method is provided, performed by a radio access network node of a wireless communication network, for handling a wireless communication device capable of alternating between an idle state, in which the wireless communication device does not listen to wireless signals from the wireless communication network, and an active state, in which the wireless communication device listens to wireless signals from the wireless communication network. The method comprises receiving packets related to a communication between the wireless communication device and an external node having a packet address external of the wireless communication network, and determining whether the packets are directed only from the external node towards the wireless communication device. Further, when the packets are determined to be directed only from the external node towards the wireless communication device, the method comprises refraining from sending a paging notification related to the packets to be sent to the wireless communication device for a first time period including at least a first in time occurring active state of the wireless communication device after the determination, and when the packets are determined not to be directed only from the external node towards the wireless communication device, the method comprises sending the paging notification related to the packets to the wireless communication device at the first in time occurring active state of the wireless communication device after the determination.

According to another aspect, a radio access network node is provided, operable in a wireless communication network, and configured for handling a wireless communication device capable of alternating between an idle state, in which the wireless communication device is not capable of receiving any signals from the wireless communication network, and an active state, in which the wireless communication device is capable of receiving signals from the wireless communication network. The radio access network node comprises a processing circuitry and a memory. The memory contains instructions executable by said processing circuitry, whereby the radio access network node is operative for receiving packets related to a communication between the wireless communication device and an external node having a packet address external of the wireless communication network, and determining whether the packets are directed only from the external node towards the wireless communication device. Further, when the packets are determined to be directed only from the external node towards the wireless communication device, the radio access network node is operative for refraining from sending a paging notification related to the packets to be sent to the wireless communication device for a first time period including at least a first in time occurring active state of the wireless communication device after the determination. And when the packets are determined not to be directed only from the external node towards the wireless communication device, the radio access network node is operative for sending the paging notification related to the packets to the wireless communication device at the first in time occurring active state of the wireless communication device after the determination.

According to other aspects, computer programs and carriers are also provided, the details of which will be described in the claims and the detailed description.

Further possible features and benefits of this solution will become apparent from the detailed description below.

BRIEF DESCRIPTION OF DRAWINGS

The solution will now be described in more detail by means of exemplary embodiments and with reference to the accompanying drawings, in which.

DETAILED DESCRIPTION

Figure 1:
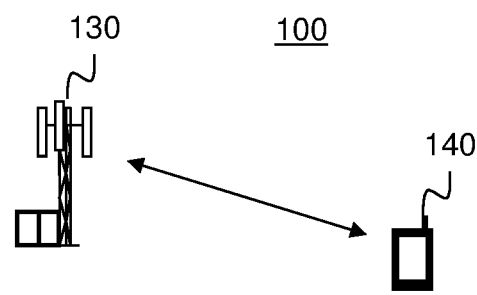
FIG. 1 is a block diagram illustrating the wireless communication entities in a wireless communication system.

FIG. 1 shows a wireless communication network 100 comprising a radio access network node 130 that is in, or is adapted for, wireless communication with a wireless communication device 140.

The wireless communication network 100 may be any kind of wireless communication network that can use a discontinuous communication method when communicating with wireless communication devices that have the possibility to use the discontinuous communication method. Example of such wireless communication networks are Global System for Mobile communication (GSM), Enhanced Data Rates for GSM Evolution (EDGE), Universal Mobile Telecommunications System (UMTS), Code Division Multiple Access 2000 (CDMA 2000), Wideband CDMA (WCDMA), Long Term Evolution (LTE), LTE Advanced, Wireless Local Area Networks (WLAN), Wide Area Networks (WAN) such as Low Power WAN (LPWAN) and LoRaWAN, Worldwide Interoperability for Microwave Access (WiMAX), WiMAX Advanced, as well as fifth generation wireless communication networks based on technology such as New Radio (NR).

The radio access network node 130 may be any kind of network node that provides wireless access to a wireless communication device 140 alone or in combination with another network node. Examples of radio access network nodes 130 are a base station (BS), a radio BS, a base transceiver station, a BS controller, a network controller, a Node B (NB), an evolved Node B (eNB), a NR BS, a Multi-cell/multicast Coordination Entity, a relay node, an access point (AP), a radio AP, a remote radio unit (RRU), a remote radio head (RRH) and a multi-standard BS (MSR BS).

The wireless communication device 140 may be any type of device capable of wirelessly communicating with a radio access network node 130 using radio signals, as long as the wireless communication device 140 can communicate using a discontinuous communication method. For example, the wireless communication device 140 may be a User Equipment (UE), a machine type UE or a UE capable of machine to machine (M2M) communication, a sensor, a tablet, a mobile terminal, a smart phone, a laptop embedded equipped (LEE), a laptop mounted equipment (LME), a USB dongle, a Customer Premises Equipment (CPE) etc.

Figure 2:
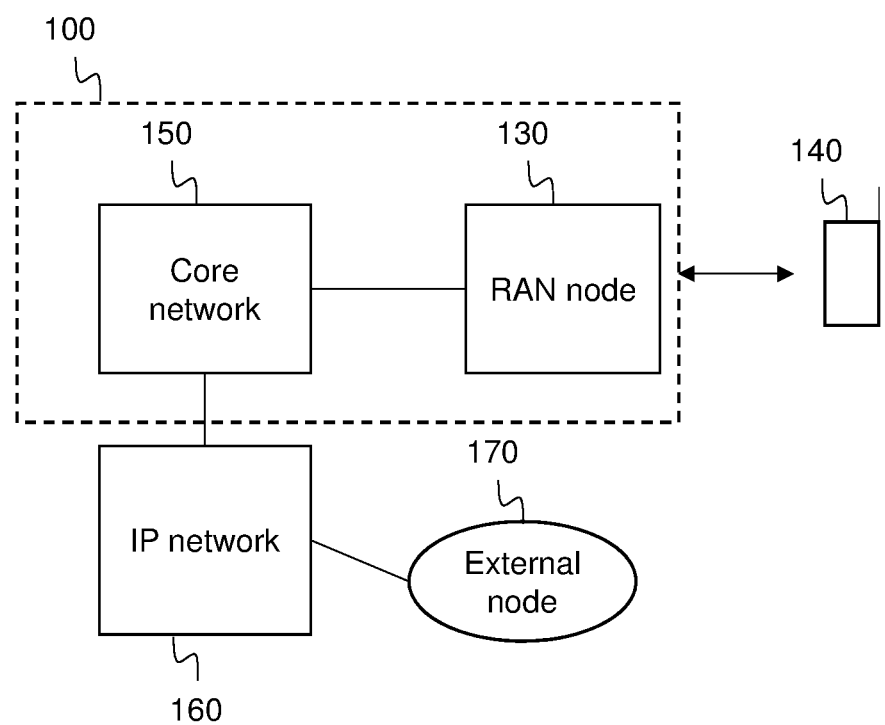
FIG. 2 is a schematic block diagram illustrating a wireless communication network connected to an IP network.

FIG. 2 shows that the wireless communication network 100 further comprises a core network 150 connected to the radio access network (RAN) node 130, either directly or via another RAN node. Further, the wireless communication network is connected to an external network 160, here exemplified by an Internet Protocol (IP) network. Further, an external node 170 is connected to the external network 160, the external node 170 having an address in the external network.

As mentioned, there is a risk that the wireless communication device 140 that is discontinuous-communication enabled, is exposed to a low-bandwidth Denial of Service attack from the external node 170. In such an attack, the external node 170 sends packets destined to the wireless communication device over a longer time period. The external node 170 does not have to send many packets as long as the packets are sent as often over a longer time period so that the wireless communication device has to be kept in the active state more or less constantly in order to be able to receive the packets. The sending of the packets may hereby drain power of the battery of the wireless communication device rather quickly.

In order to prevent such attacks, an idea of the inventors is to sort out packets that may originate from such attacks from packets that the wireless communication device has an interest to receive, and prevent the out-sorted packets from being delivered to the wireless communication device, or at least not triggering delivery of the out-sorted packets to the wireless communication device at every active state.

Figure 3:
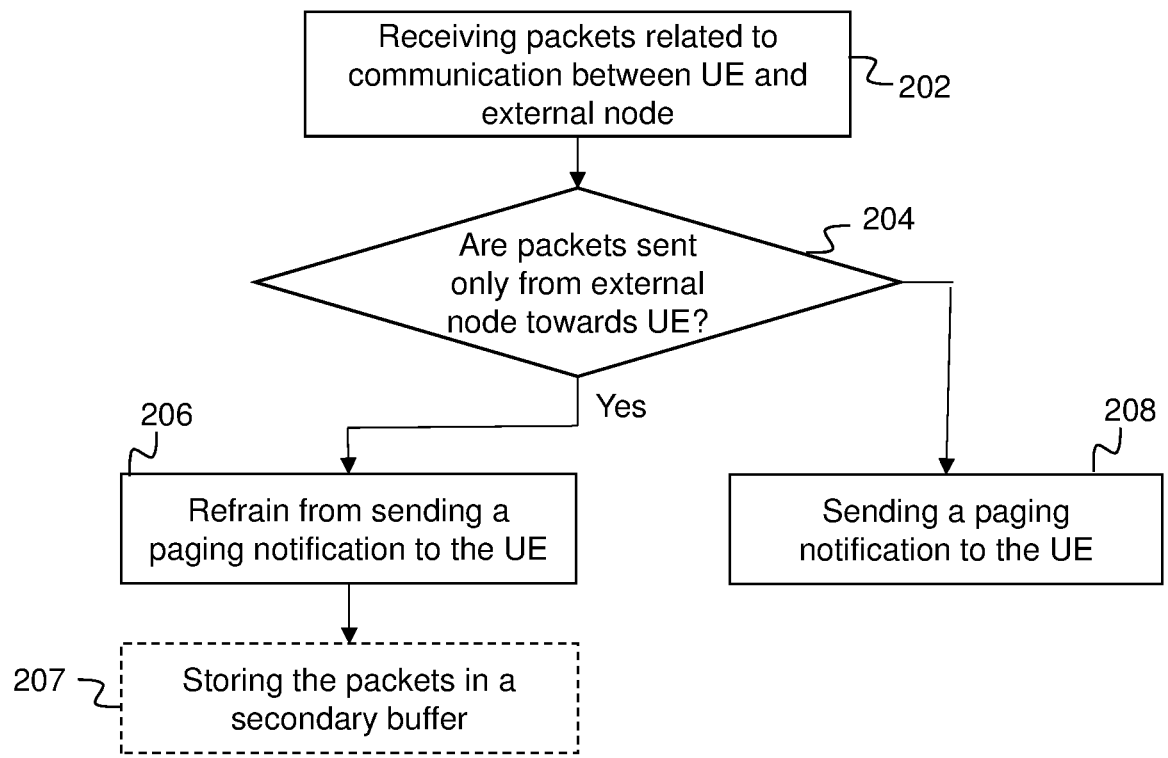
FIG. 3 is a flow chart illustrating a method performed by a radio access network node according to possible embodiments.

This idea is achieved by a method as defined in FIG. 3, in conjunction with the network of FIG. 1. The method is performed by a radio access network node 130 of a wireless communication network 100, for handling a wireless communication device 140 capable of alternating between an idle state, in which the wireless communication device 140 does not listen to wireless signals from the wireless communication network 100, and an active state, in which the wireless communication device 140 listens to wireless signals from the wireless communication network 100. The method comprises receiving 202 packets related to a communication between the wireless communication device 140 and an external node 170 having a packet address external of the wireless communication network 100, and determining 204 whether the packets are directed only from the external node 170 towards the wireless communication device 140. When the packets are determined to be directed only from the external node 170 towards the wireless communication device 140, the method comprises refraining 206 from sending a paging notification related to the packets to be sent to the wireless communication device for a first time period including at least a first in time occurring active state of the wireless communication device after the determination. Further, when the packets are determined not to be directed only from the external node 170 towards the wireless communication device 140, sending 208 the paging notification related to the packets to the wireless communication device at the first in time occurring active state of the wireless communication device after the determination.

The packets mentioned in the above paragraph are packets related only to a communication between the wireless communication device 140 and one external node 170. Consequently, the packets concerned do not comprise packets related to a communication between the wireless communication device and another external node different from the one external node, or related to a communication between another wireless communication device and the one external node. The packets may be determined not to be directed only from the external node 170 towards the wireless communication device 140 when there are packets directed only from the wireless device 140 towards the external node 170 and when there are packets directed from the external node towards the wireless device and also from the wireless device towards the external node. The first in time occurring active state after the determination, signifies the first time period or occasion when it is possible to page the wireless communication device after it has been determined whether the packets are directed only from the external node, i.e. the first time period after the determination when the wireless communication device is in any type of active state, i.e. not in the idle state (also called sleep mode or state). In case the wireless communication device is in the active state when the determining is performed, the first in time occurring active state may be that active state in which the determination is performed. When the wireless communication device is in the idle state when the determining is performed, the first in time occurring active state may be the first time period after the determination was performed when the wireless communication device is in the active state. The packets communicated may be IP packets. The refraining 206 from sending a paging notification related to the packets to be sent to the wireless communication device for a first time period including at least a first in time occurring active state of the wireless communication device after the determination may signify delaying a paging notification for the first time period, i.e. sending the paging notification after the first time period has elapsed so that the packets stored in the radio access network node are delivered to the device after the first time period has elapsed. Alternatively, the refraining 206 from sending a paging notification may signify not sending any paging notification for the packets and instead discard the packets.

By such a method, it is possible to prevent the wireless communication device to wake up from idle state in order to receive data that may not be of interest for the wireless communication device. For example, it is possible to prevent low-bandwidth attacks from external addresses, i.e. external addresses sending data e.g. periodically in order to keep the wireless communication device awake. Consequently, with this method wireless communication device battery power is saved, which could instead be used for downloading other data that is of interest to the wireless communication device.

According to an embodiment, a primary buffer and a secondary buffer for storage of received packets are connected to the radio access network node 130. The secondary buffer has lower priority than the primary buffer. The primary buffer is arranged to store packets determined not to be directed only from the external node 170 towards the wireless communication device, and the secondary buffer is arranged to store packets determined to be directed only from the external node 170 towards the wireless communication device 140. The method further comprises storing 207 the packets in the secondary buffer when the packets are determined to be directed only from the external node 170 towards the wireless communication device 140.

By storing the packets determined to be directed only from the external node 170 towards the wireless communication device 140 (called first packets) in another buffer than the packets determined not to be directed only from the external node 170 towards the wireless communication device 140 (called second packets), the second packets can easily be prioritized before the first packets. In other words, packets relating to a communication that the wireless communication device probably considers important, as the wireless communication device has sent packets itself directed to the external node, are prioritized before packets relating to communication between the external node and the wireless communication device that are only directed from the external node towards the wireless communication device.

According to an embodiment, the method further comprising discarding at least some of the packets stored in the secondary buffer when the packets stored 207 in the secondary buffer exceeds a first number. Hereby the number of packets stored in the secondary buffer can be kept on a limited storage level, saving storage space for other packets, such as later received packets. The first number may be set as a first buffer threshold that indicates when the secondary buffer is full or almost full of packets. The first number may be preset or preconfigured. In order to determine whether the number of packets stored in the secondary buffer exceeds the first number, there may be a counter connected to the secondary buffer, counting the number of packets stored and indicating when the number of packets stored exceeds the first number.

According to another alternative embodiment, when the packets stored in the secondary buffer exceeds a second number, the method further comprises sending at least some of the packets stored in the secondary buffer to the wireless communication device 140 when the wireless communication device is next time in the active state, provided that the first time period has passed. Hereby the number of packets stored in the secondary buffer can be kept on a limited storage level, saving storage space for other packets, such as later received packets. The second number may be set as a second buffer threshold that indicates when the secondary buffer is full or almost full of first packets. The second number may be preset or preconfigured. The second number may be used independent of usage of the first number. The first and the second number may be set to the same number. Alternatively, the second number may be set higher or lower than the first number. In order to determine whether the number of packets stored in the secondary buffer exceeds the second number, there may be a counter connected to the secondary buffer, counting the number of packets stored and indicating when the number of packets stored exceeds the second number.

According to another embodiment, the packets are stored 207 in the secondary buffer a predetermined storing time period. Further, the method comprises sending the packets stored in the secondary buffer to the wireless communication device 140 after the predetermined storing time period has elapsed. The storing time period may be counted from e.g. storage of an initially received IP packet or from the determination that the packets are directed only from the external node towards the wireless communication device, or from the last time the secondary buffer was emptied. Hereby, it is automatically controlled that not old packets are left in the secondary buffer.

According to another embodiment, the determining 204 whether the packets are directed only from the external node 170 towards the wireless communication device is performed during a determining time period, which determining time period starts when receiving an initial packet from the external node or from the wireless communication device. Such a defined determining time period can be set in order to better determine whether the packets are only directed from the external node towards the wireless communication device. The extent of the determining time period may be predefined, i.e. preconfigured. An "initial packet" signifies a first-in-time received packet from the external node or from the wireless communication device during a time period. When the packets received during the determining time period are directed only from the external node towards the wireless communication device, the external node may be classified as a low-priority node.

According to an alternative embodiment, the determining 204 whether the packets are directed only from the external node 170 towards the wireless communication device is performed during a determining time period, which determining time period starts after completion of a handshake sequence between the wireless communication device and the external node. Hereby it is avoided to include any of the handshake messages into the counting, which could accidently and wrongly classify the packet as being directed not only from the external node towards the wireless communication device. The handshake sequence may be a Transmission Control Protocol (TCP) handshake sequence.

Figure 4:
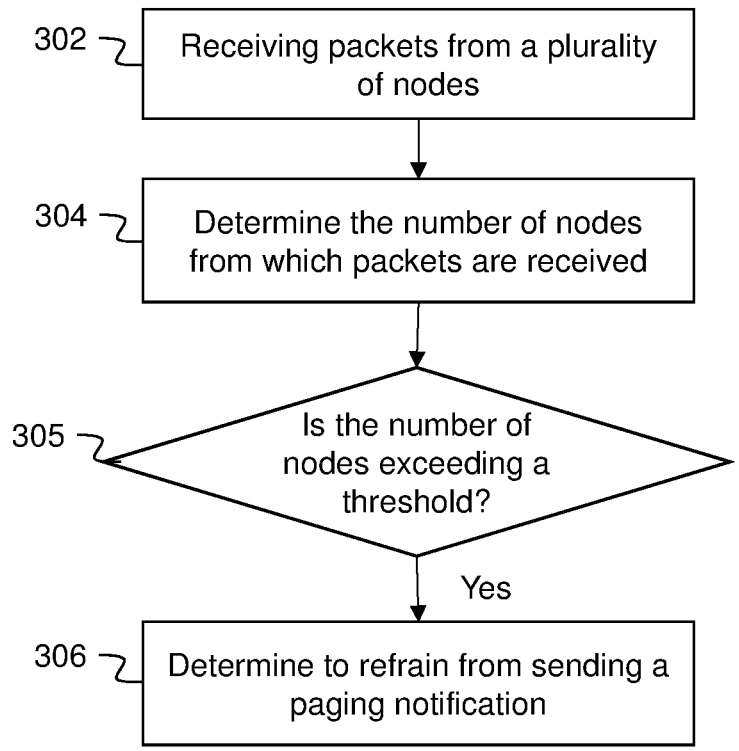
FIG. 4 is another flow chart illustrating a method performed by a radio access network node according to possible embodiments.

According to another embodiment shown in FIG. 4, the method comprises receiving 302 packets from a plurality of external nodes 170 having packet addresses external of the wireless communication network 100, the packets being destined to the wireless communication device, and determining 304 the number of the plurality of external nodes from which packets are received. Further, when the number of the plurality of external nodes is determined to exceed a threshold, the method further comprises determining 306 to refrain from sending a paging notification related to the packets from the plurality of external nodes during a third time period. Hereby it is possible to avoid low-bandwidth attacks coming from a high number of different external nodes substantially simultaneously, so called bot-nets. The third time period may be the same as, or different from, the first time period. The third time period may start from the time point of the determination 306 to refrain from sending a paging notification. The determining 304 of the number of external nodes may be performed for packets received over a time window having a preset length. By such an embodiment, it is achieved to refrain from sending paging notifications as soon as the number of external addresses sending packets destined to the wireless communication device to the radio access network node 130 becomes too high. In other words, it is not necessary to wait for the determining of direction of the packets before determining to refrain from sending paging notifications to the wireless communication device. This embodiment may possibly be subject to a divisional patent application.

According to another embodiment, the method further comprises receiving second packets related to a communication between the wireless communication device 140 and a second external node 170 having a packet address external of the wireless communication network 100 and determining whether the second packets are directed only from the second external node 170 towards the wireless communication device 140. The method further comprises, when the second packets are determined to be directed only from the second external node 170 towards the wireless communication device 140, refrain from sending a paging notification related to the second packets to the wireless communication device for a first time period including at least a first in time occurring active state of the wireless communication device after the determination of the second packets, and when the second packets are determined not to be directed only from the second external node 170 towards the wireless communication device 140, sending the paging notification related to the second packets to the wireless communication device at the first in time occurring active state of the wireless communication device after the determination of the second packets. Hereby it is defined that when there are two or more external nodes sending packets, the packets from the two external nodes are treated separately. There may be separate classification timers and possibly also separate buffer timers for different external nodes.

According to another embodiment, the wireless communication device 140 is a Discontinuous Reception mode, DRX mode, capable wireless communication device, the idle state is a DRX sleep state and the active state is a DRX active state. In this embodiment, the wireless communication network may be an LTE-based wireless communication network.

Discontinuous reception (DRX) is an example of a discontinuous communication method for saving battery power. DRX is used in Long Term Evolution (LTE)-based wireless communication networks. A standardization document defining DRX is found in 3GPP TS 136 321 V14.3.0, § 5.7 "Discontinuous Reception (DRX)". In the following, DRX is described followed by embodiments for implementing the above defined inventive methods for DRX.

DRX allows for a wireless communication device (in the following called "UE", which is the term used in LTE) to stop listening to a physical downlink control channel (PDCCH) from a radio access network node (in the following called "eNodeB", which is the term used in LTE) for an agreed amount of time to save battery power. Two modes of DRX exist on LTE, RCC_CONNECTED DRX (C-DRX) and RRC_IDLE DRX. In both modes, the DRX capable UE alternates between a DRX sleep state, where no paging is scheduled by the network, and an active DRX "ON" state where paging can occur. A DRX cycle covers one active "ON" time period and a DRX sleep period.

If no paging occurs during the "ON" window, the UE enters DRX sleep state again until the next paging occasion. The DRX sleep state is comparable to the more generic idle state mentioned in the embodiments above. The active DRX "ON" state is comparable to the more generic active state mentioned in the embodiments above.

If paging occurs while the UE is in the active state in RRC_IDLE mode, the UE will attempt to enter the active state of the RRC_CONNECTED mode, where a dedicated data channel will be set up by the network and the packets will be delivered. If paging occurs while the UE is in the active state of the RRC_CONNECTED mode, the UE will listen for incoming packets until there is no more packets to receive and acknowledge by the lower layers and a DRX inactivity timer is reached, after which the UE enters in C-DRX sleep state until the next paging occasion. Either way, the UE will stay in RRC_CONNECTED mode after the retrieval of the packets, until the reception of a RRCConnectionRelease message from the network, after which the UE will go into RRC_IDLE mode with the respective DRX settings.

A UE being DRX enabled may be kept in active state by an external node sending a flow of packets to the UE. The flow can be low-intensive; it would be enough to send one packet before the expiration of an RRC inactivity timer when the UE is in RRC_CONNECTED mode to keep the UE in RRC_CONNECTED indefinitely, and one packet before the expiration of a DRX inactivity timer when the UE is in RRC_IDLE mode to keep the UE listening to the PDCCH channel continuously, so that UE battery power drains much faster than in normal usage. Further, when in the active state of RRC_CONNECTED MODE, also air interface resources between the UE and the eNodeB serving the UE and communication resources in the eNodeB are consumed.

A solution to this problem is to map whether the communication from an external node having an external IP-address to a target DRX capable UE is one-way or two-way. If the UE sends any packet to the external node, the communication link between the external node and the DRX capable UE will be considered two-way, and DRX will not be prioritized over packet delivery. On the other hand, if packets are only sent from the external node directed to the UE, the communication is considered one way. According to an embodiment, those packets will be buffered to allow the UE to sleep, and if the number of packets in the buffer were to pass a set threshold, e.g. if the buffer would be full, packets could be discarded. According to another embodiment, once the number of packets in the buffer passes a set threshold and/or a timer has been reached, the packets could be transmitted to the UE at the end of the following DRX cycle, i.e. initiated at the active state of the following DRX cycle.

Such a solution will act as a barrier preventing sophisticated low-bandwidth Denial of Service (DoS) attacks. By implementing a buffer and by keeping the packets in the buffer until the number of packets passes a threshold, a possible attacker will be forced to increase the intensity of the attack in order to disturb the function of the UE, and an increased intensity will make it much easier to detect the attack by traditional firewalls.

Also, it may allow a user of a UE to control if he/she is interested in the traffic including the received packets or not, transparently. If the user is interested in the traffic, it can respond to the received packets and then the traffic is determined by the network node to be two-way, and the packets received from the external address will be sent to the radio access network node as soon as possible. Also, a user can preconfigure a UE, for example an IoT device, to only respond to traffic from certain IP addresses. For example, the UE could be configured to respond to pings from a certain IP address with e.g. an "ICMP echo response" so the network node prioritizes that traffic. Alternatively, a user can configure a UE not to respond to traffic coming from certain IP addresses. In that case, the network node will classify the traffic as one-way and not prioritize sending the traffic to the UE.

According to an embodiment, the eNodeB is equipped with a primary buffer for each DRX capable UE for storing of packets when at least one of the packets is sent from the UE towards the external network node. Further, the eNodeB is equipped with a secondary buffer for each DRX capable UE for storing of packets when the packets are only sent from the external node directed to the UE. The packets in the primary buffer are prioritized to send to the UE before the packets in the secondary buffer. The eNodeB may have a table with external addresses to which the UE is communicating, including a flag to indicate for each UE when the communication is only from the external address towards the UE.

According to another embodiment, when a packet comes from a non-mapped external address, a classification timer may be started. If no packet has been sent from the UE to the external address by the time the classification timer expires, the communication to which the packet belongs will be considered one-way. On the other hand, if any packet has been sent from the UE to the external address by the time the classification timer expires the communication is considered two way.

A classification as one-way for the given external address may be triggered when the classification timer expires and when there has been no response from the UE during the classification time. When the UE is the one initiating the communication with the external node, the eNodeB will automatically map the external address as two-way for a period of time. When the external address is classified as two-way, any packets coming from the external address and directed to the UE will be treated as legacy DRX. That is, packet delivery will be prioritized over DRX. When the external address is classified as one-way, the packets will be stored in a buffer, until the number of packets stored in the buffer passes a threshold and/or a timeout is reached. If the number of packets passes a threshold, packets may be discarded. According to another embodiment, once the buffer is full and/or a timeout is reached, the packets may be delivered to the UE at the next active state.

In one embodiment, the buffer in which one-way classified packets are stored may be shared among all one-way communication from external nodes targeting the UE. In other embodiments, the buffer can be implemented as multiple buffers, each buffer being associated with a certain range of external IP addresses.

Effectively, the embodiments shown above will make a communication channel between an external one-way address and a UE seem as a channel with high packet delay variation (jitter) and low reliability.

According to another embodiment, in the case where the number of non-mapped external addresses, i.e. external addresses not yet classified, exceeds a certain limit, all non-mapped external addresses can be considered as one-way and consequently down prioritized, with the goal of minimizing the effects when such an attack is initiated from a large pool of IPs, like a botnet.

As mentioned, the above solutions can be applied to wireless communication networks other than LTE. For networks with dynamic schedulers, like WCDMA and WiMax, the above solutions will allow the scheduler freedom to allow the wireless communication devices to enter in sleep/DRX mode.

For networks without a dynamic scheduler, where the downlink/paging intervals are fixed, this solution offers the possibility to implement a simple scheduler (like for LoRaWAN Class B devices) or an improvement over existing solutions, (like the Scheduled Automatic Power Save Delivery (S-APSD) functionality for WLAN), so the traffic deemed one way can be delayed to other paging occasions in favor of power saving.

Figure 5:
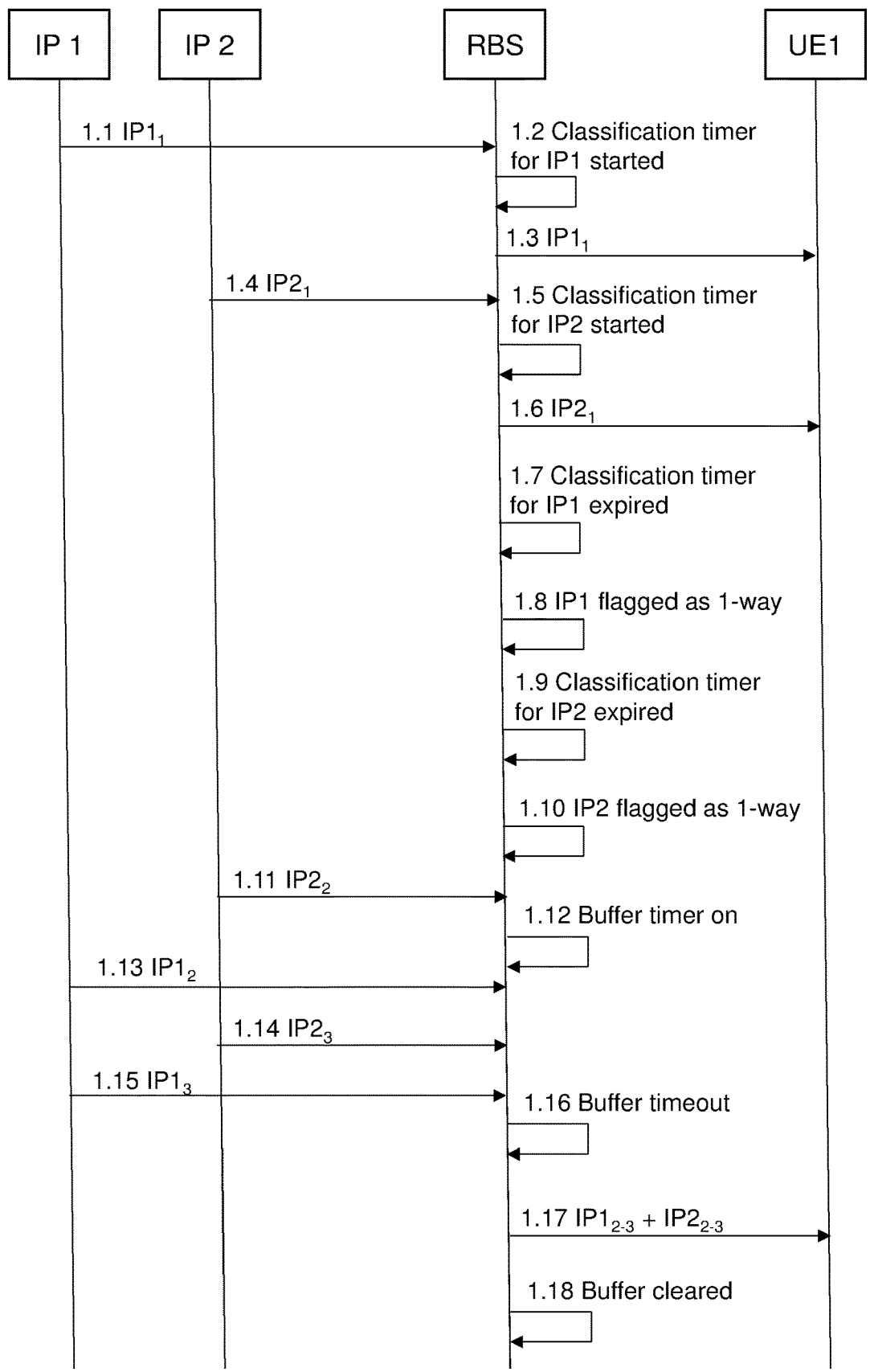
FIG. 5 is a signaling diagram illustrating an example of a communication scenario, when possible embodiments of the invention are used.

The signaling diagram of FIG. 5 illustrates an example of an embodiment for handling of IP packets being sent from two external IP-addresses, IP1 and IP2 the packets being addresses to a UE, UE1. In this example, the communication between the respective IP address and UE1 are both determined to be directed only from the external address towards UE1, as will be shown. First, a first IP packet $IP1_1$ from the first IP address IP1 is sent 1.1 to the radio base station RBS serving UE1. The sending order of the packets are marked with a suffix so that the $y^{th}$ packet sent from the $x^{th}$ address is marked $IPx_y$. The packets are sent to the RBS via the Internet and a core network of the mobile communication system, such as an Enhanced Packet Core, EPC, the EPC having an IP gateway. The EPC/Internet is not shown in the signaling diagram to make the figure easier to read. At reception of $IP1_1$, the RBS starts 1.2 a classification timer for IP1 in order to classify whether the communication between IP1 and UE1 is only directed from IP1 towards the UE1. Then $IP1_1$ is sent 1.3 to UE1. Thereafter, a first packet $IP2_1$ is sent 1.4 from IP2 to the RBS, and in response to receiving this packets, the RBS starts 1.5 a similar classification timer also for IP2, and $IP2_1$ is sent 1.6 to UE1. When the classification timer for IP1 expires 1.7, the RBS determines whether the packets it has received regarding communication between IP1 and UE1 during the classification timer period are only directed from IP1 towards the UE1. As this is the case (only $IP1_1$ received, and it is received from IP1), IP1 is flagged 1.8 as one-way, and the forthcoming packets from IP1 towards UE1 are to be stored in a buffer of the RBS, which buffer may be a secondary buffer as explained earlier. A little later, the classification timer for IP2 expires 1.9, and the RBS determines that the packets it has received regarding communication between IP2 and UE1 during this classification timer period are only directed from IP2 towards UE1, IP2 is also flagged 1.10 as one-way. Then when the following packet $IP2_2$ is received 1.11 from IP2 it is stored in the buffer and a buffer timer starts running 1.12. Following packets received from IP1 and IP2, i.e. $IP1_2$, $IP2_3$, $IP1_3$, at 1.13-1.15 are also stored in the buffer. When the buffer timer has timed out 1.16, the packets in the buffer, $IP1_{2-3}$ and $IP2_{2-3}$, are sent 1.17 to UE1. The buffer is then emptied 1.18 from the stored packets. In this example there is a common buffer used for packets from IP1 and IP2, however, there may be separate buffers with separate buffer timers as well, for the different external addresses. Also, the situation may occur when the buffer gets full, or at least above a certain threshold. In this case, according to an embodiment, packets arriving when it has been determined that the buffer is full may be discarded.

Figure 6:
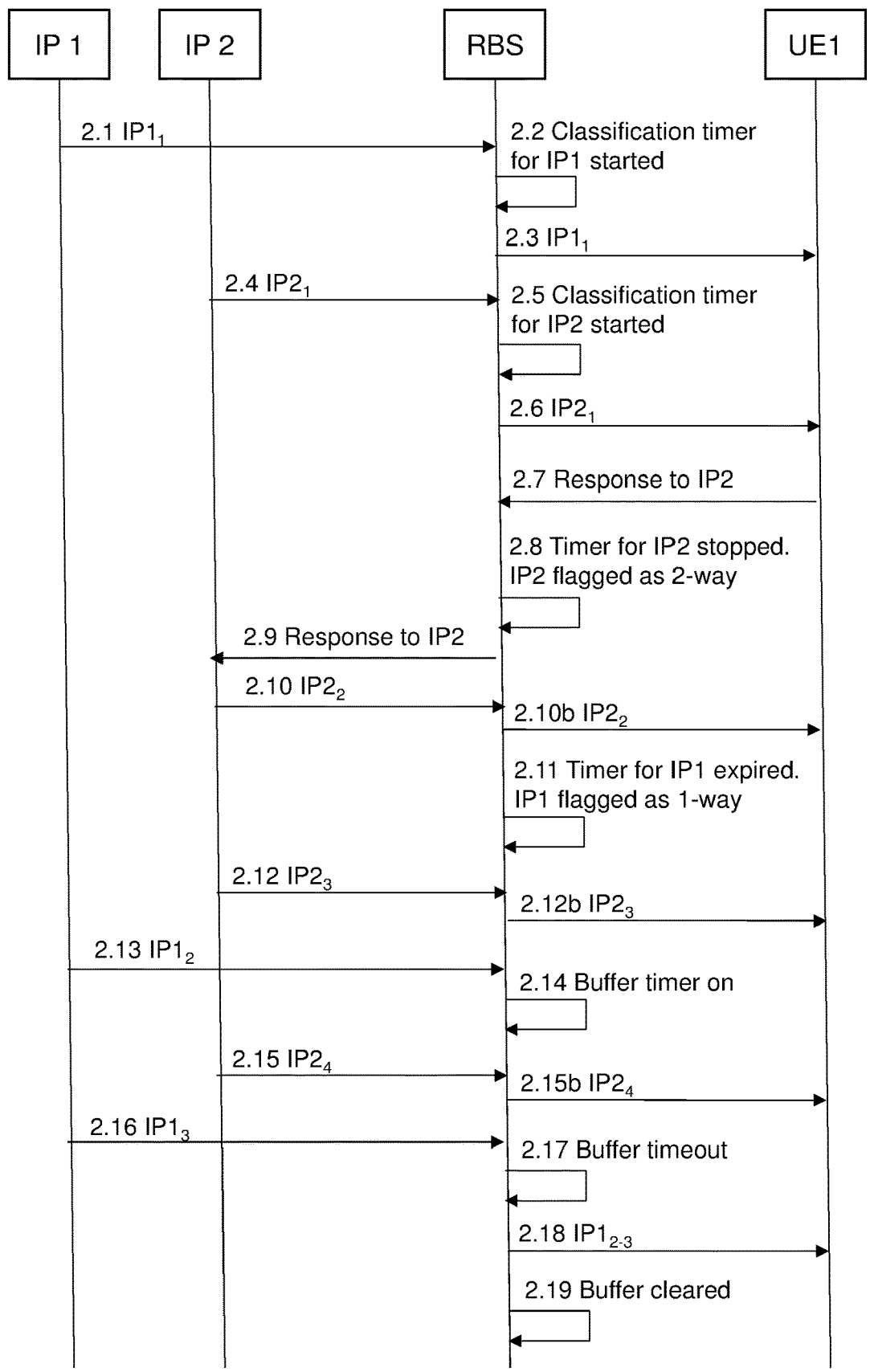
FIG. 6 is another signaling diagram illustrating another example of a communication scenario, when possible embodiments of the invention are used

The signaling diagram of FIG. 6 illustrates another example of handling of IP packets sent from IP1 and IP2 and addressed to UE1. In this example, the communication between IP1 and UE1 is determined to be directed only from IP1 towards UE1, and the communication between IP2 and UE1 is determined not to be directed only from IP2 towards UE1, as will be shown below. First, a first packet $IP1_1$ is sent 2.1 from the first IP address IP1 to the RBS serving UE1. At reception of $IP1_1$, the RBS starts 2.2 a classification timer for IP1 in order to classify whether the communication between IP1 and UE1 is only directed from IP1 towards the UE1. Then $IP1_1$ is sent 2.3 to UE1. Thereafter, a first packet $IP2_1$ is sent 2.4 from IP2 to the RBS, and in response to receiving this packet, the RBS starts 2.5 a similar classification timer also for IP2, and $IP2_1$ is sent 2.6 to UE1. Then the RBS receives 2.7 a response from UE1 addressed to IP2. In response to this received response, the RBS determines that the packets it has received regarding communication between IP2 and UE1 are not only directed from IP2 towards the UE1, the IP2 is flagged 2.8 as two-way, and the classification timer for IP2 is stopped. The response from the UE is delivered 2.9 to IP2. A following packet $IP2_2$ received 2.10 from IP2 towards UE1 is then not stored but instead delivered 2.10b to UE1. A little later, the classification timer for IP1 expires 2.11, and the RBS determines that the packets it has received regarding communication between IP1 and UE1 during this classification timer period for IP1 are only directed from IP1 towards UE1, and IP1 is flagged as one-way. Then the following packets $IP2_3$, $IP2_4$ received 2.12, 2.15 by the RBS are triggered to be delivered 2.12b, 2.15b to UE1 at the following active state. On the other hand, the following packet $IP1_2$ received 2.13 from IP1 is stored in the buffer and a buffer timer starts running 2.14. Following packets received from IP1, i.e. $IP1_3$, 2.16 is also stored in the buffer. When the buffer timer has timed out 2.17, the packets in the buffer, $IP1_{2-3}$, are sent 2.18 to UE1. The buffer is then emptied 2.19 from the stored packets.

Figure 7:
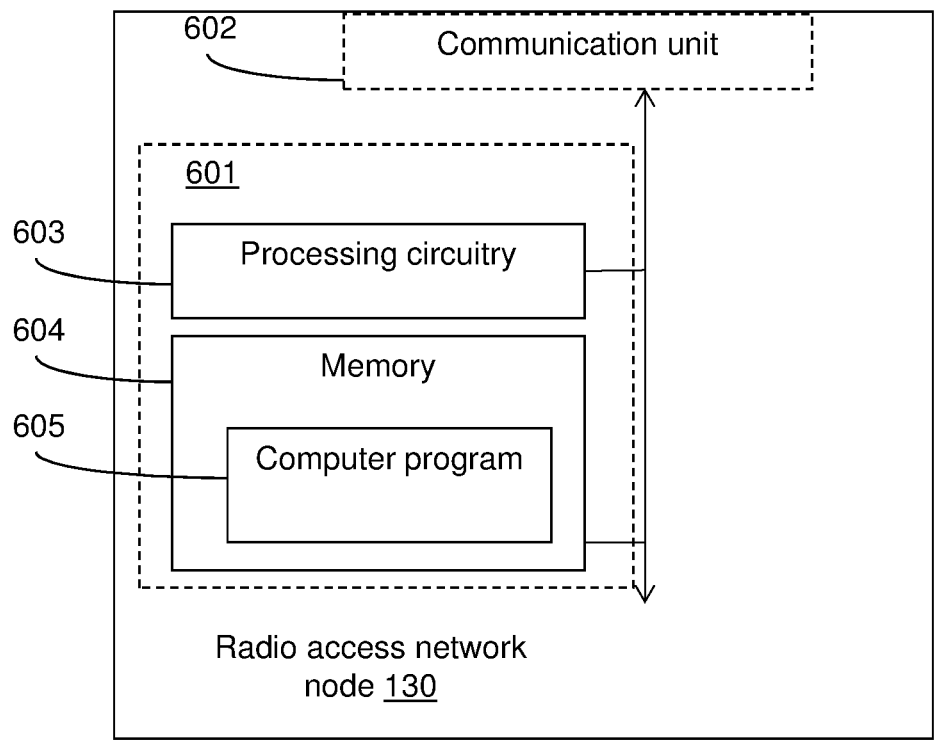
FIGS. 7-8 are block diagrams illustrating a radio access network node in more detail, according to further possible embodiments.

FIG. 7, in conjunction with FIG. 2, describes a radio access network node 130 operable in a wireless communication network 100, configured for handling a wireless communication device 140 capable of alternating between an idle state, in which the wireless communication device 140 is not capable of receiving any signals from the wireless communication network 100, and an active state, in which the wireless communication device 140 is capable of receiving signals from the wireless communication network 100. The radio access network node 130 comprises a processing circuitry 603 and a memory 604. The memory contains instructions executable by said processing circuitry, whereby the radio access network node 130 is operative for receiving packets related to a communication between the wireless communication device 140 and an external node 170 having a packet address external of the wireless communication network 100, and determining whether the packets are directed only from the external node 170 towards the wireless communication device 140. Further, when the packets are determined to be directed only from the external node 170 towards the wireless communication device 140, the radio access network node 130 is operative for refraining from sending a paging notification related to the packets to be sent to the wireless communication device for a first time period including at least a first in time occurring active state of the wireless communication device after the determination. And when the packets are determined not to be directed only from the external node 170 towards the wireless communication device 140, the radio access network node 130 is operative for sending the paging notification related to the packets to the wireless communication device at the first in time occurring active state of the wireless communication device after the determination.

According to an embodiment, the radio access network node 130 is connected to a primary buffer and a secondary buffer for storage of received packets. The secondary buffer has lower priority than the primary buffer. The primary buffer is arranged to store packets determined not to be directed only from the external node 170 towards the wireless communication device 140. The secondary buffer is arranged to store packets determined to be directed only from the external node 170 towards the wireless communication device 140. The radio access network node 130 is further operative for, when the packets are determined to be directed only from the external node 170 towards the wireless communication device 140, storing the packets in the secondary buffer.

According to an embodiment, the radio access network node 130 is further operative for discarding at least some of the packets stored in the secondary buffer when the packets stored in the secondary buffer exceeds a first number.

According to a variant of this embodiment, when the packets stored in the secondary buffer exceeds a second number, the radio access network node is operative for sending at least some of the packets stored in the secondary buffer to the wireless communication device 140 when the wireless communication device is next time in the active state, provided that the first time period has passed.

According to another variant, the radio access network node 130 is operative for storing the packets in the secondary buffer a predetermined storing time period, and further operative for sending the packets stored in the secondary buffer to the wireless communication device 140 after the predetermined storing time period has elapsed.

According to another embodiment, the radio access network node 130 is operative for determining whether the packets are directed only from the external node 170 towards the wireless communication device during a determining time period, which determining time period starts when receiving an initial packet from the external node or from the wireless communication device.

According to another embodiment, the radio access network node 130 is operative for determining whether the packets are directed only from the external node 170 towards the wireless communication device during a determining time period, which determining time period starts after completion of a handshake sequence between the wireless communication device and the external node.

According to another embodiment, the radio access network node 130 is further operative for receiving packets from a plurality of external nodes 170 having packet addresses external of the wireless communication network 100, the packets being destined to the wireless communication device, and determining the number of the plurality of external nodes from which packets are received. And when the number of the plurality of external nodes is determined to exceed a threshold, the radio access network node 130 is operative for determining to refrain from sending a paging notification related to the packets from the plurality of external nodes during a third time period.

According to another embodiment, the radio access network node 130 is further operative for receiving second packets related to a communication between the wireless communication device 140 and a second external node 170 having a packet address external of the wireless communication network 100, and determining whether the second packets are directed only from the second external node 170 towards the wireless communication device 140. Further, when the second packets are determined to be directed only from the second external node 170 towards the wireless communication device 140, the radio access network node 130 is operative for refraining from sending a paging notification related to the second packets to the wireless communication device for a first time period including at least a first in time occurring active state of the wireless communication device after the determination of the second packets. Further, when the second packets are determined not to be directed only from the second external node 170 towards the wireless communication device 140, the radio access network node 130 is operative for sending the paging notification related to the second packets to the wireless communication device at the first in time occurring active state of the wireless communication device after the determination of the second packets.

According to another embodiment, the wireless communication device 140 is a Discontinuous Reception mode, DRX mode, capable wireless communication device, the idle state is a DRX sleep state and the active state is a DRX active state.

According to other embodiments, the radio access network node 130 may further comprise a communication unit 602, which may be considered to comprise conventional means for communication with the core network 150 or with other radio access network nodes in the network 100. The communication unit 602 may also comprise conventional means for wireless communication with the UE 140, such as a transceiver for wireless transmission and reception. The instructions executable by said processing circuitry 603 may be arranged as a computer program 605 stored e.g. in said memory 604. The processing circuitry 603 and the memory 604 may be arranged in a sub-arrangement 601. The sub-arrangement 601 may be a micro-processor and adequate software and storage therefore, a Programmable Logic Device, PLD, or other electronic component(s)/processing circuit(s) configured to perform the methods mentioned above. The processing circuitry 603 may comprise one or more programmable processor, application-specific integrated circuits, field programmable gate arrays or combinations of these adapted to execute instructions.

The computer program 605 may be arranged such that when its instructions are run in the processing circuitry, they cause the radio access network node 130 to perform the steps described in any of the described embodiments of the radio access network node 130 and its method. The computer program 605 may be carried by a computer program product connectable to the processing circuitry 603. The computer program product may be the memory 604, or at least arranged in the memory. The memory 604 may be realized as for example a RAM (Random-access memory), ROM (Read-Only Memory) or an EEPROM (Electrical Erasable Programmable ROM). Further, the computer program 605 may be carried by a separate computer-readable medium, such as a CD, DVD or flash memory, from which the program could be downloaded into the memory 604. Alternatively, the computer program may be stored on a server or any other entity connected to the wireless communication network 100 to which the radio access network node 130 has access via the communication unit 602. The computer program 605 may then be downloaded from the server into the memory 604.

Figure 8:
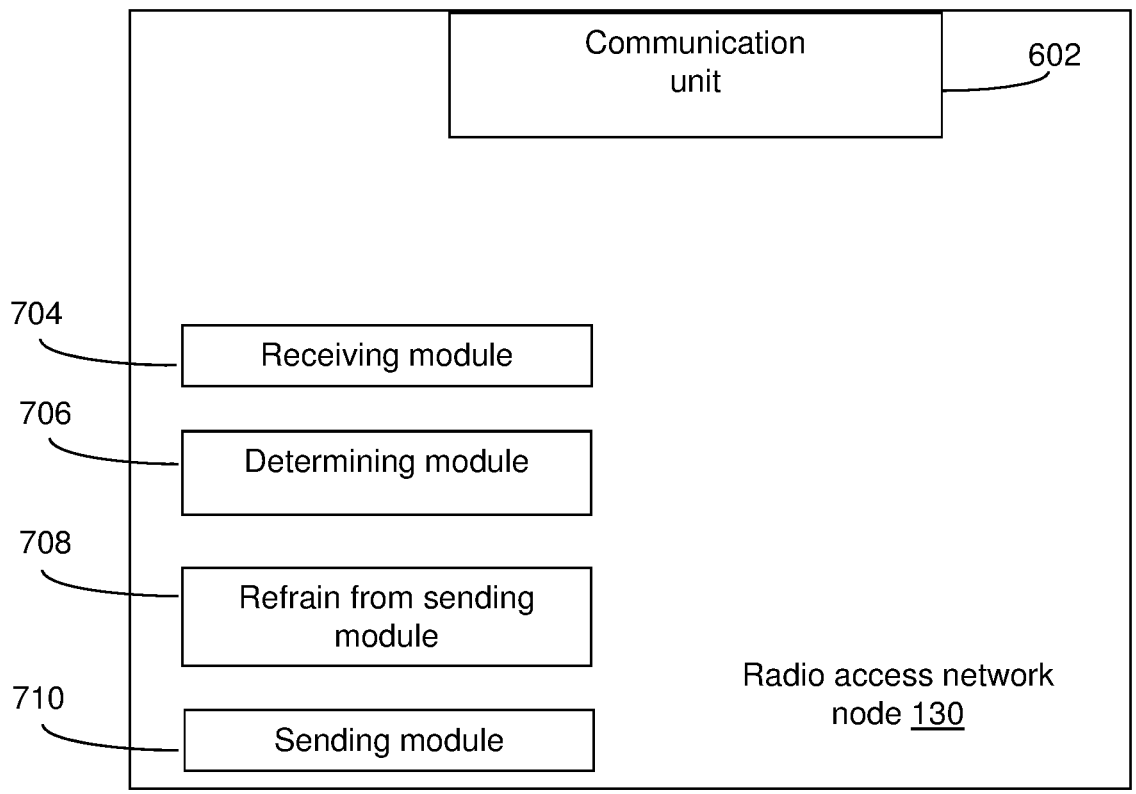

FIG. 8 in conjunction with FIG. 2, shows another embodiment of a radio access network node 130 operable in a wireless communication network 100. The radio access network node 130 is configured for handling a wireless communication device 140 capable of alternating between an idle state, in which the wireless communication device 140 is not capable of receiving any signals from the wireless communication network 100, and an active state, in which the wireless communication device 140 is capable of receiving signals from the wireless communication network 100. The radio access network node 130 comprises a receiving module 704 for receiving packets related to a communication between the wireless communication device 140 and an external node 170 having a packet address external of the wireless communication network 100, and a determining module 706 for determining whether the packets are directed only from the external node 170 towards the wireless communication device 140. The radio access network node 130 further comprises; a refrain-from-sending module 708 for refraining from sending a paging notification related to the packets to be sent to the wireless communication device for a first time period including at least a first in time occurring active state of the wireless communication device after the determination, when the packets are determined to be directed only from the external node 170 towards the wireless communication device 140. The radio access network node further comprises a sending module 710 for sending the paging notification related to the packets to the wireless communication device at the first in time occurring active state of the wireless communication device after the determination, when the packets are determined not to be directed only from the external node 170 towards the wireless communication device 140. The radio access network node 130 may further comprise a communication unit 602 similar to the communication unit described in FIG. 7. In an embodiment, the modules of FIG. 8 are implemented as a computer program running on a processing circuitry, such as the processing circuitry 603 shown in FIG. 7.

Figure 9:
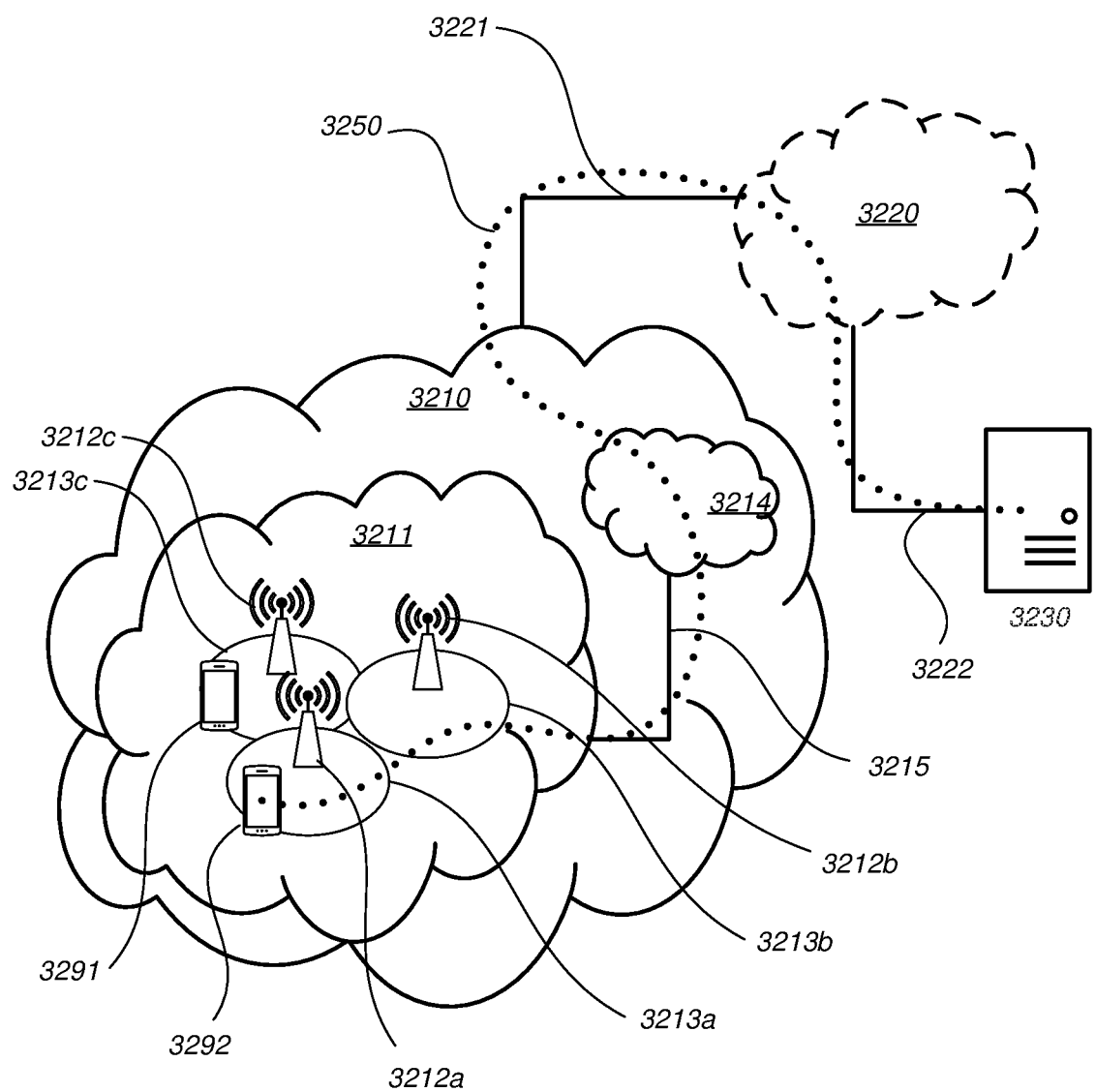
FIG. 9 schematically illustrates a telecommunication network connected via an intermediate network to a host computer.

With reference to FIG. 9, in accordance with an embodiment, a communication system includes a telecommunication network 3210, such as a 3GPP-type cellular network, which comprises an access network 3211, such as a radio access network, and a core network 3214. The access network 3211 comprises a plurality of base stations 3212a, 3212b, 3212c, such as NBs, eNBs, gNBs or other types of wireless access points, each defining a corresponding coverage area 3213a, 3213b, 3213c. Each base station 3212a, 3212b, 3212c is connectable to the core network 3214 over a wired or wireless connection 3215. A first user equipment (UE) 3291 located in coverage area 3213c is configured to wirelessly connect to, or be paged by, the corresponding base station 3212c. A second UE 3292 in coverage area 3213a is wirelessly connectable to the corresponding base station 3212a. While a plurality of UEs 3291, 3292 are illustrated in this example, the disclosed embodiments are equally applicable to a situation where a sole UE is in the coverage area or where a sole UE is connecting to the corresponding base station 3212.

The telecommunication network 3210 is itself connected to a host computer 3230, which may be embodied in the hardware and/or software of a standalone server, a cloud-implemented server, a distributed server or as processing resources in a server farm. The host computer 3230 may be under the ownership or control of a service provider, or may be operated by the service provider or on behalf of the service provider. The connections 3221, 3222 between the telecommunication network 3210 and the host computer 3230 may extend directly from the core network 3214 to the host computer 3230 or may go via an optional intermediate network 3220. The intermediate network 3220 may be one of, or a combination of more than one of, a public, private or hosted network; the intermediate network 3220, if any, may be a backbone network or the Internet; in particular, the intermediate network 3220 may comprise two or more sub-networks (not shown).

The communication system of FIG. 9 as a whole enables connectivity between one of the connected UEs 3291, 3292 and the host computer 3230. The connectivity may be described as an over-the-top (OTT) connection 3250. The host computer 3230 and the connected UEs 3291, 3292 are configured to communicate data and/or signaling via the OTT connection 3250, using the access network 3211, the core network 3214, any intermediate network 3220 and possible further infrastructure (not shown) as intermediaries. The OTT connection 3250 may be transparent in the sense that the participating communication devices through which the OTT connection 3250 passes are unaware of routing of uplink and downlink communications. For example, a base station 3212 may not or need not be informed about the past routing of an incoming downlink communication with data originating from a host computer 3230 to be forwarded (e.g., handed over) to a connected UE 3291. Similarly, the base station 3212 need not be aware of the future routing of an outgoing uplink communication originating from the UE 3291 towards the host computer 3230.

Example implementations, in accordance with an embodiment, of the UE, base station and host computer discussed in the preceding paragraphs will now be described with reference to FIG. 10. In a communication system 3300, a host computer 3310 comprises hardware 3315 including a communication interface 3316 configured to set up and maintain a wired or wireless connection with an interface of a different communication device of the communication system 3300. The host computer 3310 further comprises processing circuitry 3318, which may have storage and/or processing capabilities. In particular, the processing circuitry 3318 may comprise one or more programmable processors, application-specific integrated circuits, field programmable gate arrays or combinations of these (not shown) adapted to execute instructions. The host computer 3310 further comprises software 3311, which is stored in or accessible by the host computer 3310 and executable by the processing circuitry 3318. The software 3311 includes a host application 3312. The host application 3312 may be operable to provide a service to a remote user, such as a UE 3330 connecting via an OTT connection 3350 terminating at the UE 3330 and the host computer 3310. In providing the service to the remote user, the host application 3312 may provide user data which is transmitted using the OTT connection 3350.

The communication system 3300 further includes a base station 3320 provided in a telecommunication system and comprising hardware 3325 enabling it to communicate with the host computer 3310 and with the UE 3330. The hardware 3325 may include a communication interface 3326 for setting up and maintaining a wired or wireless connection with an interface of a different communication device of the communication system 3300, as well as a radio interface 3327 for setting up and maintaining at least a wireless connection 3370 with a UE 3330 located in a coverage area (not shown in FIG. 10) served by the base station 3320. The communication interface 3326 may be configured to facilitate a connection 3360 to the host computer 3310. The connection 3360 may be direct or it may pass through a core network (not shown in FIG. 10) of the telecommunication system and/or through one or more intermediate networks outside the telecommunication system. In the embodiment shown, the hardware 3325 of the base station 3320 further includes processing circuitry 3328, which may comprise one or more programmable processors, application-specific integrated circuits, field programmable gate arrays or combinations of these (not shown) adapted to execute instructions. The base station 3320 further has software 3321 stored internally or accessible via an external connection.

The communication system 3300 further includes the UE 3330 already referred to. Its hardware 3335 may include a radio interface 3337 configured to set up and maintain a wireless connection 3370 with a base station serving a coverage area in which the UE 3330 is currently located. The hardware 3335 of the UE 3330 further includes processing circuitry 3338, which may comprise one or more programmable processors, application-specific integrated circuits, field programmable gate arrays or combinations of these (not shown) adapted to execute instructions. The UE 3330 further comprises software 3331, which is stored in or accessible by the UE 3330 and executable by the processing circuitry 3338. The software 3331 includes a client application 3332. The client application 3332 may be operable to provide a service to a human or non-human user via the UE 3330, with the support of the host computer 3310. In the host computer 3310, an executing host application 3312 may communicate with the executing client application 3332 via the OTT connection 3350 terminating at the UE 3330 and the host computer 3310. In providing the service to the user, the client application 3332 may receive request data from the host application 3312 and provide user data in response to the request data. The OTT connection 3350 may transfer both the request data and the user data. The client application 3332 may interact with the user to generate the user data that it provides.

It is noted that the host computer 3310, base station 3320 and UE 3330 illustrated in FIG. 33 may be identical to the host computer 3230, one of the base stations 3212a, 3212b, 3212c and one of the UEs 3291, 3292 of FIG. 9, respectively. This is to say, the inner workings of these entities may be as shown in FIG. 10 and independently, the surrounding network topology may be that of FIG. 9.

Figure 10:
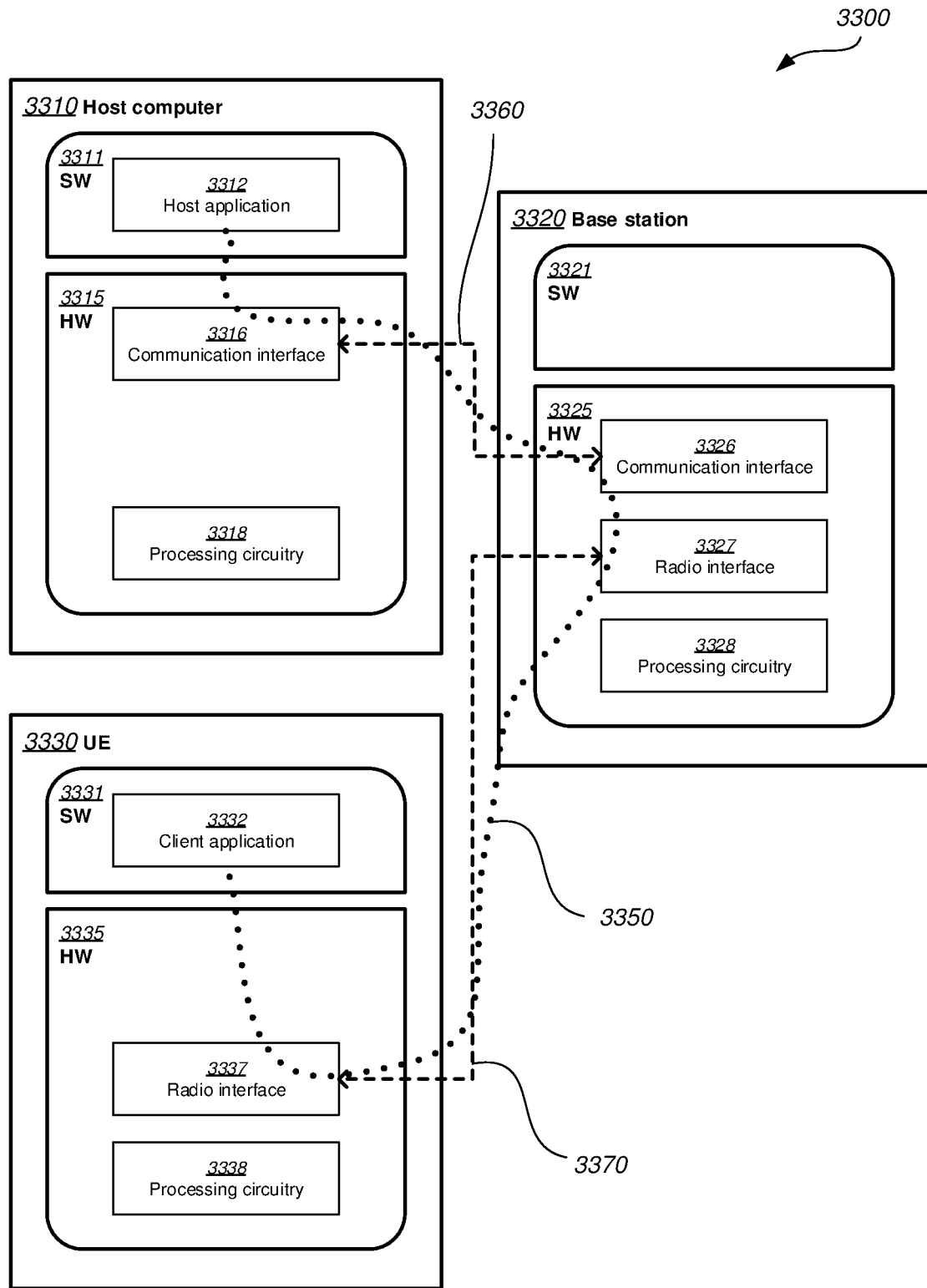
FIG. 10 is a generalized block diagram of a host computer communicating via a base station with a user equipment over a partially wireless connection.

In FIG. 10, the OTT connection 3350 has been drawn abstractly to illustrate the communication between the host computer 3310 and the use equipment 3330 via the base station 3320, without explicit reference to any intermediary devices and the precise routing of messages via these devices. Network infrastructure may determine the routing, which it may be configured to hide from the UE 3330 or from the service provider operating the host computer 3310, or both. While the OTT connection 3350 is active, the network infrastructure may further take decisions by which it dynamically changes the routing (e.g., on the basis of load balancing consideration or reconfiguration of the network).

The wireless connection 3370 between the UE 3330 and the base station 3320 is in accordance with the teachings of the embodiments described throughout this disclosure. One or more of the various embodiments improve the performance of OTT services provided to the UE 3330 using the OTT connection 3350, in which the wireless connection 3370 forms the last segment. More precisely, the teachings of these embodiments may improve the power consumption of the UE as the UE can be kept in idle mode for longer time periods, further, as data not interesting for the UE to receive can be discarded at the radio base station, data that are of interest for the user of the UE can be sent with an enhanced data rate, i.e. an enhanced rate for downstream communication of UE-relevant data is achieved. Thereby benefits such as extended battery life time and better responsiveness can be achieved.

A measurement procedure may be provided for the purpose of monitoring data rate, latency and other factors on which the one or more embodiments improve. There may further be an optional network functionality for reconfiguring the OTT connection 3350 between the host computer 3310 and UE 3330, in response to variations in the measurement results. The measurement procedure and/or the network functionality for reconfiguring the OTT connection 3350 may be implemented in the software 3311 of the host computer 3310 or in the software 3331 of the UE 3330, or both. In embodiments, sensors (not shown) may be deployed in or in association with communication devices through which the OTT connection 3350 passes; the sensors may participate in the measurement procedure by supplying values of the monitored quantities exemplified above, or supplying values of other physical quantities from which software 3311, 3331 may compute or estimate the monitored quantities. The reconfiguring of the OTT connection 3350 may include message format, retransmission settings, preferred routing etc.; the reconfiguring need not affect the base station 3320, and it may be unknown or imperceptible to the base station 3320. Such procedures and functionalities may be known and practiced in the art. In certain embodiments, measurements may involve proprietary UE signaling facilitating the host computer's 3310 measurements of throughput, propagation times, latency and the like. The measurements may be implemented in that the software 3311, 3331 causes messages to be transmitted, in particular empty or 'dummy' messages, using the OTT connection 3350 while it monitors propagation times, errors etc.

Figure 11:
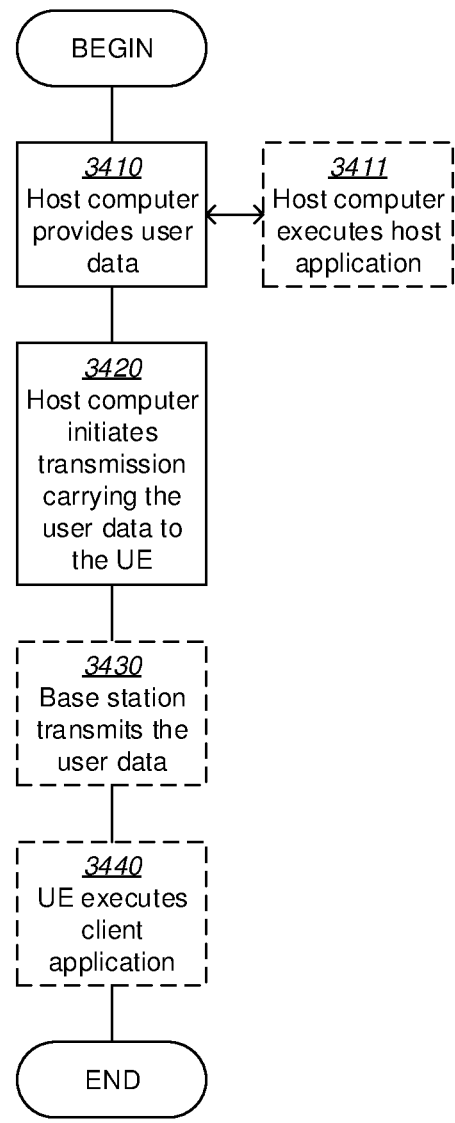
FIGS. 11-14 are flowcharts illustrating methods implemented in a communication system including a host computer, a base station and a user equipment.

FIG. 11 is a flowchart illustrating a method implemented in a communication system, in accordance with one embodiment. The communication system includes a host computer, a base station and a UE which may be those described with reference to FIGS. 9 and 10. For simplicity of the present disclosure, only drawing references to FIG. 11 will be included in this section. In a first step 3410 of the method, the host computer provides user data. In an optional substep 3411 of the first step 3410, the host computer provides the user data by executing a host application. In a second step 3420, the host computer initiates a transmission carrying the user data to the UE. In an optional third step 3430, the base station transmits to the UE the user data which was carried in the transmission that the host computer initiated, in accordance with the teachings of the embodiments described throughout this disclosure. In an optional fourth step 3440, the UE executes a client application associated with the host application executed by the host computer.

Figure 12:
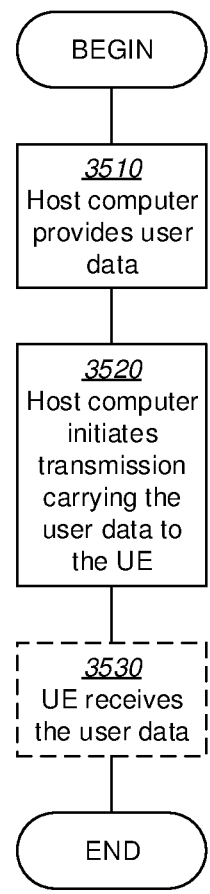

FIG. 12 is a flowchart illustrating a method implemented in a communication system, in accordance with one embodiment. The communication system includes a host computer, a base station and a UE which may be those described with reference to FIGS. 9 and 10. For simplicity of the present disclosure, only drawing references to FIG. 12 will be included in this section. In a first step 3510 of the method, the host computer provides user data. In an optional substep (not shown) the host computer provides the user data by executing a host application. In a second step 3520, the host computer initiates a transmission carrying the user data to the UE. The transmission may pass via the base station, in accordance with the teachings of the embodiments described throughout this disclosure. In an optional third step 3530, the UE receives the user data carried in the transmission.

Figure 13:
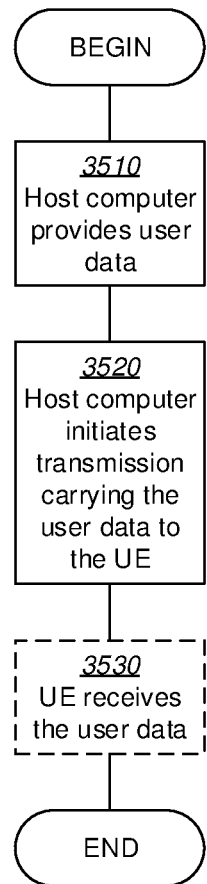

FIG. 13 is a flowchart illustrating a method implemented in a communication system, in accordance with one embodiment. The communication system includes a host computer, a base station and a UE which may be those described with reference to FIGS. 9 and 10. For simplicity of the present disclosure, only drawing references to FIG. 13 will be included in this section. In an optional first step 3610 of the method, the UE receives input data provided by the host computer. Additionally or alternatively, in an optional second step 3620, the UE provides user data. In an optional substep 3621 of the second step 3620, the UE provides the user data by executing a client application. In a further optional substep 3611 of the first step 3610, the UE executes a client application which provides the user data in reaction to the received input data provided by the host computer. In providing the user data, the executed client application may further consider user input received from the user. Regardless of the specific manner in which the user data was provided, the UE initiates, in an optional third substep 3630, transmission of the user data to the host computer. In a fourth step 3640 of the method, the host computer receives the user data transmitted from the UE, in accordance with the teachings of the embodiments described throughout this disclosure.

Figure 14:
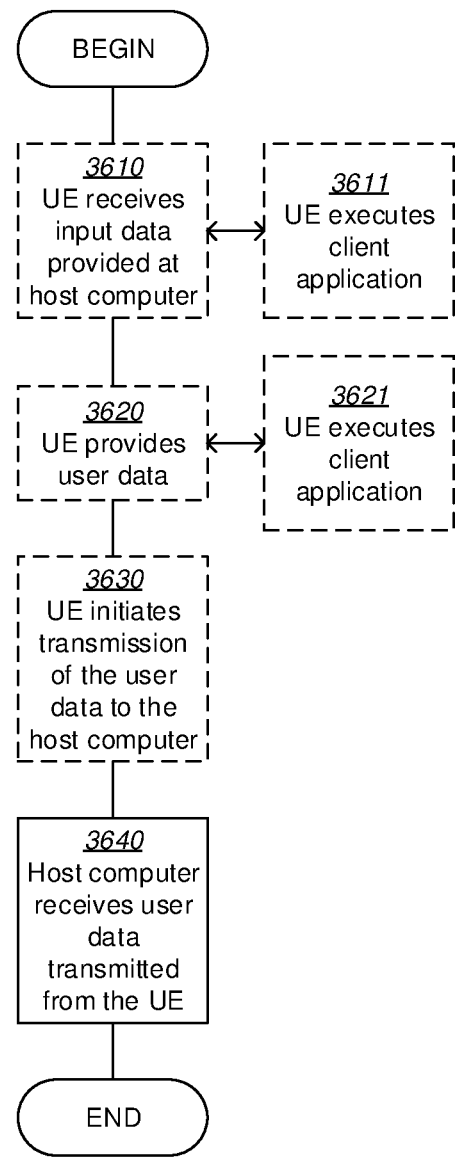

FIG. 14 is a flowchart illustrating a method implemented in a communication system, in accordance with one embodiment. The communication system includes a host computer, a base station and a UE which may be those described with reference to FIGS. 9 and 12. For simplicity of the present disclosure, only drawing references to FIG. 14 will be included in this section. In an optional first step 3710 of the method, in accordance with the teachings of the embodiments described throughout this disclosure, the base station receives user data from the UE. In an optional second step 3720, the base station initiates transmission of the received user data to the host computer. In a third step 3730, the host computer receives the user data carried in the transmission initiated by the base station.

Numbered Embodiments

5. A communication system including a host computer comprising:
   processing circuitry configured to provide user data; and
   a communication interface configured to forward the user data to a cellular network for transmission to a user equipment (UE),
   wherein the cellular network comprises a base station having a radio interface and processing circuitry, the base station's processing circuitry configured for:
   receiving packets related to a communication between the UE and an external node having a packet address external of the wireless communication network,
   determining whether the packets are directed only from the external node towards the UE; and
   when the packets are determined to be directed only from the external node towards the UE, refraining from sending a paging notification related to the packets to be sent to the UE for a first time period including at least a first in time occurring active state of the UE after the determination, and
   when the packets are determined not to be directed only from the external node towards the UE, sending the paging notification related to the packets to the UE at the first in time occurring active state of the UE after the determination.

6. The communication system of embodiment 5, further including the base station.

7. The communication system of embodiment 6, further including the UE, wherein the UE is configured to communicate with the base station.

8. The communication system of embodiment 7, wherein:
   the processing circuitry of the host computer is configured to execute a host application, thereby providing the user data; and
   the UE comprises processing circuitry configured to execute a client application associated with the host application.

15. A method implemented in a communication system including a host computer, a base station and a user equipment (UE), the method comprising:
   at the host computer, providing user data; and
   at the host computer, initiating a transmission carrying the user data to the UE via a cellular network comprising the base station, wherein the base station is:
   receiving packets related to a communication between the UE and an external node having a packet address external of the wireless communication network,
   determining whether the packets are directed only from the external node towards the UE;
   when the packets are determined to be directed only from the external node towards the UE, refraining from sending a paging notification related to the packets to be sent to the UE for a first time period including at least a first in time occurring active state of the UE after the determination, and
   when the packets are determined not to be directed only from the external node towards the UE, sending the paging notification related to the packets to the UE at the first in time occurring active state of the UE after the determination.

16. The method of embodiment 15, further comprising:
   at the base station, transmitting the user data.

17. The method of embodiment 16, wherein the user data is provided at the host computer by executing a host application, the method further comprising:
   at the UE, executing a client application associated with the host application.

65. A communication system including a host computer comprising a communication interface configured to receive user data originating from a transmission from a user equipment (UE) to a base station, wherein the base station comprises a radio interface and processing circuitry, the base station's processing circuitry configured for:
   receiving packets related to a communication between the UE and an external node having a packet address external of the wireless communication network,
   determining whether the packets are directed only from the external node towards the UE; and
   when the packets are determined to be directed only from the external node towards the UE, refraining from sending a paging notification related to the packets to be sent to the UE for a first time period including at least a first in time occurring active state of the UE after the determination, and
   when the packets are determined not to be directed only from the external node towards the UE, sending the paging notification related to the packets to the UE at the first in time occurring active state of the UE after the determination.

66. The communication system of embodiment 65, further including the base station.
67. The communication system of embodiment 66, further including the UE, wherein the UE is configured to communicate with the base station.
68. The communication system of embodiment 67, wherein:
the processing circuitry of the host computer is configured to execute a host application;
the UE is configured to execute a client application associated with the host application, thereby providing the user data to be received by the host computer.
75. A method implemented in a communication system including a host computer, a base station and a user equipment (UE), the method comprising:
at the host computer, receiving, from the base station, user data originating from a transmission which the base station has received from the UE, wherein the base station is:
receiving packets related to a communication between the UE and an external node having a packet address external of the wireless communication network,
determining whether the packets are directed only from the external node towards the UE; and
when the packets are determined to be directed only from the external node towards the UE, refraining from sending a paging notification related to the packets to be sent to the UE for a first time period including at least a first in time occurring active state of the UE after the determination, and
when the packets are determined not to be directed only from the external node towards the UE, sending the paging notification related to the packets to the UE at the first in time occurring active state of the UE after the determination.
76. The method of embodiment 75, further comprising:
at the base station, receiving the user data from the UE.
77. The method of embodiment 76, further comprising:
at the base station, initiating a transmission of the received user data to the host computer.

Although the description above contains a plurality of specificities, these should not be construed as limiting the scope of the concept described herein but as merely providing illustrations of some exemplifying embodiments of the described concept. It will be appreciated that the scope of the presently described concept fully encompasses other embodiments which may become obvious to those skilled in the art, and that the scope of the presently described concept is accordingly not to be limited. Reference to an element in the singular is not intended to mean "one and only one" unless explicitly so stated, but rather "one or more." All structural and functional equivalents to the elements of the above-described embodiments that are known to those of ordinary skill in the art are expressly incorporated herein by reference and are intended to be encompassed hereby. Moreover, it is not necessary for an apparatus or method to address each and every problem sought to be solved by the presently described concept, for it to be encompassed hereby. In the exemplary figures, a broken line generally signifies that the feature within the broken line is optional.

The invention claimed is:
1. A method performed by a radio access network node of a wireless communication network, for handling a wireless communication device capable of alternating between an idle state, in which the wireless communication device does not listen to wireless signals from the wireless communication network, and an active state, in which the wireless communication device listens to wireless signals from the wireless communication network, the method comprising:
receiving packets related to a communication between the wireless communication device and an external node having a packet address external of the wireless communication network;
determining whether the packets are directed only from the external node towards the wireless communication device; and
when the packets are determined to be directed only from the external node towards the wireless communication device, refraining from sending a paging notification related to the packets to be sent to the wireless communication device for a first time period including at least a first in time occurring active state of the wireless communication device after the determination, and
when the packets are determined not to be directed only from the external node towards the wireless communication device, sending the paging notification related to the packets to the wireless communication device at the first in time occurring active state of the wireless communication device after the determination.
2. The method according to claim 1, wherein connected to the radio access network node are a primary buffer and a secondary buffer for storage of received packets, the secondary buffer having lower priority than the primary buffer, the primary buffer to store packets determined not to be directed only from the external node towards the wireless communication device, the secondary buffer to store packets determined to be directed only from the external node towards the wireless communication device, the method further comprises, when the packets are determined to be directed only from the external node towards the wireless communication device, storing the packets in the secondary buffer.
3. The method according to claim 2, further comprising discarding at least some of the packets stored in the secondary buffer when the packets stored in the secondary buffer exceeds a first number.
4. The method according to claim 2, wherein when the packets stored in the secondary buffer exceeds a second number, the method further comprises sending at least some of the packets stored in the secondary buffer to the wireless communication device when the wireless communication device is next time in the active state, provided that the first time period has passed.
5. The method according to claim 2, wherein the packets are stored in the secondary buffer a predetermined storing time period, and the method further comprises sending the packets stored in the secondary buffer to the wireless communication device after the predetermined storing time period has elapsed.
6. The method according to claim 1, wherein the determining whether the packets are directed only from the external node towards the wireless communication device is performed during a determining time period, which determining time period starts when receiving an initial packet from the external node or from the wireless communication device.
7. The method according to claim 1, wherein the determining whether the packets are directed only from the external node towards the wireless communication device is performed during a determining time period, which determining time period starts after completion of a handshake sequence between the wireless communication device and the external node.
8. The method according to claim 1, further comprising:
receiving packets from a plurality of external nodes having packet addresses external of the wireless com- munication network), the packets being destined to the wireless communication device;

determining a number of the plurality of external nodes from which packets are received; and when the number of the plurality of external nodes is determined to exceed a threshold, refraining from sending a paging notification related to the packets from the plurality of external nodes during a third time period.

9. The method according to claim 1, further comprising:
receiving second packets related to a communication between the wireless communication device and a second external node having a packet address external of the wireless communication network;

determining whether the second packets are directed only from the second external node towards the wireless communication device; and when the second packets are determined to be directed only from the second external node towards the wireless communication device, refrain from sending a paging notification related to the second packets to the wireless communication device for a first time period including at least a first in time occurring active state of the wireless communication device after the determination of the second packets, and when the second packets are determined not to be directed only from the second external node towards the wireless communication device, sending the paging notification related to the second packets to the wireless communication device at the first in time occurring active state of the wireless communication device after the determination of the second packets.

10. The method according to claim 1, wherein the wireless communication device is a Discontinuous Reception (DRX) mode capable wireless communication device, and wherein the idle state is a DRX sleep state and the active state is a DRX active state.

11. A radio access network node in a wireless communication network, configured for handling a wireless communication device capable of alternating between an idle state, in which the wireless communication device is not capable of receiving signals from the wireless communication network, and an active state, in which the wireless communication device is capable of receiving signals from the wireless communication network, the radio access network node comprising:
a processing circuitry; and
a memory containing instructions which, when executed by said processing circuitry, cause the radio access network node to:
receive packets related to a communication between the wireless communication device and an external node having a packet address external of the wireless communication network;
determine whether the packets are directed only from the external node towards the wireless communication device; and
when the packets are determined to be directed only from the external node towards the wireless communication device, refrain from sending a paging notification related to the packets to be sent to the wireless communication device for a first time period including at least a first in time occurring active state of the wireless communication device after the determination, and
when the packets are determined not to be directed only from the external node towards the wireless communication device, send the paging notification related to the packets to the wireless communication device at the first in time occurring active state of the wireless communication device after the determination.

12. The radio access network node according to claim 11, connected to a primary buffer and a secondary buffer for storage of received packets, the secondary buffer having lower priority than the primary buffer, the primary buffer to store packets determined not to be directed only from the external node towards the wireless communication device, the secondary buffer to store packets determined to be directed only from the external node towards the wireless communication device, the radio access network node further to, when the packets are determined to be directed only from the external node towards the wireless communication device, store the packets in the secondary buffer.

13. The radio access network node according to claim 12, further to discard at least some of the packets stored in the secondary buffer when the packets stored in the secondary buffer exceeds a first number.

14. The radio access network node according to claim 12, wherein when the packets stored in the secondary buffer exceeds a second number, the radio access network node is further to send at least some of the packets stored in the secondary buffer to the wireless communication device when the wireless communication device is next time in the active state, provided that the first time period has passed.

15. The radio access network node according to claim 12, to store the packets in the secondary buffer a predetermined storing time period, and further to send the packets stored in the secondary buffer to the wireless communication device after the predetermined storing time period has elapsed.

16. The radio access network node according to claim 11, to determine whether the packets are directed only from the external node towards the wireless communication device during a determining time period, which determining time period starts when receiving an initial packet from the external node or from the wireless communication device.

17. The radio access network node according to claim 11, to determine whether the packets are directed only from the external node towards the wireless communication device during a determining time period, which determining time period starts after completion of a handshake sequence between the wireless communication device and the external node.

18. The radio access network node according to claim 11, further to:
receive packets from a plurality of external nodes having packet addresses external of the wireless communication network, the packets being destined to the wireless communication device;
determine a number of the plurality of external nodes from which packets are received; and
when the number of the plurality of external nodes is determined to exceed a threshold, refrain from sending a paging notification related to the packets from the plurality of external nodes during a third time period.

19. The radio access network node according to claim 11, further operative for to:
receive second packets related to a communication between the wireless communication device and a second external node having a packet address external of the wireless communication network,
determine whether the second packets are directed only from the second external node towards the wireless communication device; and when the second packets are determined to be directed only from the second external node towards the wireless communication device, refrain from sending a paging notification related to the second packets to the wireless communication device for a first time period including at least a first in time occurring active state of the wireless communication device after the determination of the second packets, and when the second packets are determined not to be directed only from the second external node towards the wireless communication device, send the paging notification related to the second packets to the wireless communication device at the first in time occurring active state of the wireless communication device after the determination of the second packets.

20. The radio access network node according to claim 11, wherein the wireless communication device is a Discontinuous Reception (DRX) mode capable wireless communication device, and wherein the idle state is a DRX sleep state and the active state is a DRX active state.

21. A non-transitory computer-readable storage medium comprising instructions which, when executed by at least one processing circuitry of a radio access network node of a wireless communication network, configured for handling a wireless communication device capable of alternating between an idle state, in which the wireless communication device is not capable of receiving any signals from the wireless communication network, and an active state, in which the wireless communication device is capable of receiving signals from the wireless communication network, cause the radio access network node to perform operations comprising:

receiving packets related to a communication between the wireless communication device and an external node having a packet address external of the wireless communication network;

determining whether the packets are directed only from the external node towards the wireless communication device; and when the packets are determined to be directed only from the external node towards the wireless communication device, refraining from sending a paging notification related to the packets to be sent to the wireless communication device for a first time period including at least a first in time occurring active state of the wireless communication device after the determination, and when the packets are determined not to be directed only from the external node towards the wireless communication device, sending the paging notification related to the packets to the wireless communication device at the first in time occurring active state of the wireless communication device after the determination.

* * * * *

UNITED STATES PATENT AND TRADEMARK OFFICE
CERTIFICATE OF CORRECTION

PATENT NO. : 11,166,256 B2
APPLICATION NO. : 16/967419
DATED : November 2, 2021
INVENTOR(S) : Alberto Gonzalez Escudero It is certified that error appears in the above-identified patent and that said Letters Patent is hereby corrected as shown below:

In the Specification

In Column 4, Lines 50-51, delete "laptop embedded equipped (LEE)," and insert -- laptop embedded equipment (LEE), --, therefor.

In Column 7, Line 39, delete "that not" and insert -- that no --, therefor.

In Column 11, Line 35, delete "addresses" and insert -- addressed --, therefor.

In Column 17, Line 55, delete "use equipment" and insert -- user equipment --, therefor.

In the Claims

In Column 24, Line 60, in Claim 19, delete "further operative for to:" and insert -- further to: --, therefor.

Signed and Sealed this
Seventeenth Day of May, 2022

Katherine Kelly Vidal
*Director of the United States Patent and Trademark Office*